US010001804B2

(12) United States Patent
Conti et al.

(10) Patent No.: US 10,001,804 B2
(45) Date of Patent: Jun. 19, 2018

(54) FORCE-FEEDBACK DEVICE AND METHOD

(75) Inventors: Francois Conti, Menlo Park, CA (US); Sebastien Grange, Sion (CH); Patrick Helmer, Preverenges (CH); Patrice Rouiller, Trelex (CH)

(73) Assignee: FORCE DIMENSION S.A.R.L., Lausanne (CH)

( * ) Notice: Subject to any disclaimer, the term of this patent is extended or adjusted under 35 U.S.C. 154(b) by 1045 days.

(21) Appl. No.: 12/228,260

(22) Filed: Aug. 11, 2008

(65) Prior Publication Data

US 2010/0032255 A1 Feb. 11, 2010

(51) Int. Cl.

| | |
|---|---|
| ***B60T 13/04*** | (2006.01) |
| ***G05G 9/047*** | (2006.01) |
| ***G05G 5/03*** | (2008.04) |
| *H02K 49/00* | (2006.01) |

(52) U.S. Cl.

CPC ............... *G05G 9/047* (2013.01); *G05G 5/03* (2013.01); *G05G 2009/04766* (2013.01)

(58) Field of Classification Search

CPC ........ F16D 61/00; F16D 63/00; F16D 63/008; F16D 65/00; F16D 2066/003; F16D 2125/70; F16D 2500/7061; G05G 9/047; G05G 5/103; G05G 2009/04766

USPC ......... 188/67, 156, 159, 166, 73.1; 345/173; 340/407.1; 74/490.01, 490.02, 490.03, 74/490.05

See application file for complete search history.

(56) References Cited

U.S. PATENT DOCUMENTS

| | | | | |
|---|---|---|---|---|
| 5,630,155 A * | 5/1997 | Karaki et al. | ................. | 713/340 |
| 6,215,470 B1 * | 4/2001 | Rosenberg et al. | ........... | 345/156 |
| 6,319,169 B1 * | 11/2001 | Avila | .............................. | 477/94 |
| 7,735,843 B2 * | 6/2010 | Dotsey et al. | ............. | 280/47.38 |

(Continued)

OTHER PUBLICATIONS

Bonev, I., "Delta Parallel Robot—The Story of Success," http://www.parallemic.org/Reviews/Review002.html printed on Feb. 19, 2009. pp. 1-7.

(Continued)

*Primary Examiner* — Melody M Burch

(74) *Attorney, Agent, or Firm* — Frost Brown Todd LLC

(57) ABSTRACT

A force-feedback device comprising a first member; a first kinematics bond being coupled with said first member; said first kinematics bond being constructed to provide at least one degree of freedom for movements of said first member; said first kinematics bond comprising a braking device being constructed to constrain movements of the said first member in at least one of said at least one degree of freedom; and a energy storing/release device being constructed to store energy in response to a movement of said first member in at least one of said at least one degree of freedom constrained by said braking device. A method of providing force-feedback including constraining a movement of a member of a haptic device in at least one degree of freedom; moving the member, by an externally applied force, in at least one of the at least one constraint degree of freedom; storing energy generated by the moving of the member; determining a force required to move the member in at least one of the at least one constraint degree of freedom; releasing at least a portion of the stored energy to generate at least a portion of the required force and transmitting the at least a portion of the required force to the member.

11 Claims, 9 Drawing Sheets

(56) References Cited

U.S. PATENT DOCUMENTS

| | | | | |
|---|---|---|---|---|
| 2002/0185342 | A1* | 12/2002 | Bausch et al. | 188/161 |
| 2003/0042802 | A1* | 3/2003 | Pierre et al. | 310/36 |
| 2006/0027430 | A1* | 2/2006 | Strueber | 188/161 |
| 2006/0044271 | A1* | 3/2006 | Anastas | 345/163 |

OTHER PUBLICATIONS

Campion, G., et al., "Initial results using Eddy Current Brakes as Fast Turn-on, Programmable Physical Dampers for Haptic Rendering," 2006 Symposium on Haptic Interfaces for Virtual Environment and Teleoperator Systems IEEE VR, Arlington, VA (Mar. 25-26, 2006) pp. 73-74.

Chen, E. et al., "Six Degree-of-Freedom Haptic System for Desktop Virtual Prototyping Applications," Virtual Reality and Prototyping, Laval, France (Jun. 1999).

Colgate, J.E. et al., "Factors Affecting the Z-Width of a Haptic Display," In Proc. IEEE Int. Conf. on Robotics and Automation, Las Alamitos, CA (1994) pp. 3205-3210.

Colgate, J.E. et al., "Implementation of Stiff Virtual Walls in Force-Reflecting Interfaces," In Proc. of the IEEE Virtual Reality Annual International Symposium, Piscataway, NJ. Service Center, (1993) pp. 202-208.

Colgate, J.E. et al., "Nonholonomic Haptic Display," Proc. of the IEEE International Conference on Robotics and Automation (1996).

Conti, F. et al., "Spanning large workspaces using small haptic devices," World Haptics, Pisa, Italy (2005).

Conti, F. et al., "The CHAI libraries," Eurohaptics, Dublin, Ireland (Jun. 2003).

Ernst, S., "Robotic approach to catheter ablation," Current Opinion in Cardiology, vol. 23 (Jan. 2008) pp. 28-31.

Grange, S. et al., "Overview of the Delta Haptic Device," Eurohaptics'01, Birmingham, England (Jul. 2001).

Guthart, G.S. et al., "The Intuitive™ Telesurgery System: Overview and Application," Intuitive Surg. Inc., Proc. of the IEEE International Conference on Robotics and Automation (Apr. 2000) pp. 618-621.

ISIS Robotics, "The SurgiScope," http://www.isis-robotics.com/en/products.html, printed Feb. 19, 2009.

Kwon, T-B. et al., "Force display using a hybrid haptic device composed of motors and brakes," Mechatronics, vol. 16 (2006) pp. 249-257.

Lawrence, D.A. et al., "Rate-Hardness: A New Performance Metric for Haptic Interfaces," Robotics and Automation, vol. 16(4) (Aug. 2000) pp. 357-371.

Marti, G. et al., "Biopsy navigator: a smart haptic interface for interventional radiological gestures," Computer Assisted Radiology and Surgery, London, England (2003).

Massi, T.H. et al., The PHANTOM Haptic Interface: A Device for Probing Virtual Objects, Proc. of ASME Dynamics Systems and Control, vol. 1 (1994) pp. 295-301.

Matsuoka, Y. et al., "Design of life-sized haptic environments," Experimental Robotics VII, Rus and Singh, ed. (2001).

Mehling, J.S. et al., "Increasing the Impedance Range of a Haptic Display by Adding Electrical Damping," in Proc. First Joint Eurohaptics Conference and Symposium on Haptic Interfaces for Virtual Environments and Teleoperator Systems WHC'05 (2005) pp. 257-262.

Novint, "The Falcon Haptic Device," http://home.novint.com/products/technical_specs.php printed Feb. 19, 2009.

Ramstein, C. et al., "The PANTOGRAPH: A Large Workspace Haptic Device for a Multi-Modal Human-Computer Interaction," Conference on Human Factors in Computing SystemsACM/SIGCHI Companion, Boston, MA (Apr. 1994) pp. 57-58.

Salisbury, K. et al., "Haptic Rendering Introductory Concepts," IEEE CG&A (Jan.-Feb. 2004) pp. 24-32.

Weghe, M.V. et al., "Demonstration of a Large Dissipative Haptic Environment," Symposium on Haptic Interfaces for Virtual Environment and Teleoperator Systems, Alexandria, VA (Mar. 25-26, 2006).

Wiederick, H.D. et al., "Magnetic braking: Simple theory and experiment," Am. J. Phys., vol. 55(6) (Jun. 1987) pp. 500-503.

* cited by examiner $k_s$ : stiffness of the torsion spring
$x_0$ : value from the primary position sensor
$x_1$ : value from the secondary position sensor $\tau_d$ : desired torque
$\tau_{cb}$ : commanded torque to the brake
$\tau_m$ : measured torque from the elastic coupling
$\tau_a$ : actual torque $k_s$ : stiffness of the torsion spring
$x_0$ : value from the primary position sensor
$x_1$ : value from the secondary position sensor $\tau_d$ : desired torque
$\tau_{cb}$ : commanded torque to the brake
$\tau_{cm}$: commanded torque to the mini-motor
$\tau_m$ : measured torque from the elastic coupling
$\tau_a$ : actual torque

FORCE-FEEDBACK DEVICE AND METHOD

FIELD OF THE INVENTION

The present invention relates to field of force-feedback devices and methods.

BACKGROUND OF THE INVENTION

In general, interest and demand towards technology providing force-feedback in various fields, such as automotive, entertainment, medical, mobility and computing areas, is steadily increasing. For example, applications concerning haptic devices, robotic devices, medical robots, man-machine interfaces, virtual environment scenarios and the like will significantly benefit from realistic force-feedback capabilities. Present approaches often suffer from complex arrangements limited force-feedback capabilities and the like. The present disclosure addresses the demands and interests towards force-feedback technologies.

BRIEF SUMMARY OF THE INVENTION

According to an aspect, there is provided a force-feedback apparatus, comprising a first member, a first kinematics bond being coupled with said first member; said first kinematics bond being constructed to provide at least one degree of freedom for movements of said first member, said first kinematics bond comprising a braking device being constructed to constrain movements of the said first member in at least one of said at least one degree of freedom; and a energy storing/release device being constructed to store energy in response to a movement of said first member in at least one of said at least one degree of freedom constrained by said braking device.

According to a further aspect, there is provided a force-feedback arrangement comprising an input member, an output member, at least one member arranged between said input member and said output member, said at least one member being coupled with a kinematics bond, which is constructed to provide at least one degree of freedom for movements of a respective one of said at least one member, and which comprises a braking device being constructed to constrain movements of said respective one of said at least one member in at least one of said at least one degree of freedom, and a energy storing/release device being constructed to store energy in response to a movement of said respective one of said at least one member in at least one of said at least one degree of freedom constrained by said braking device.

According to a further aspect, there is provided a method of providing force-feedback comprising constraining a movement of a member in at least one degree of freedom; moving the member, by an externally applied force, in at least one of the at least one constraint degree of freedom; storing energy generated by the moving of the member; determining a force required to move the member in at least one of the at least one constraint degree of freedom; releasing at least a portion of the stored energy to generate at least a portion of the required force and transmitting the at least a portion of the required force to the member.

BRIEF DESCRIPTION OF THE DRAWING

Embodiments of the invention will now be described, by way of example, and with reference to the accompanying drawings, in which.

DETAILED DESCRIPTION OF EMBODIMENTS

Figure 1:
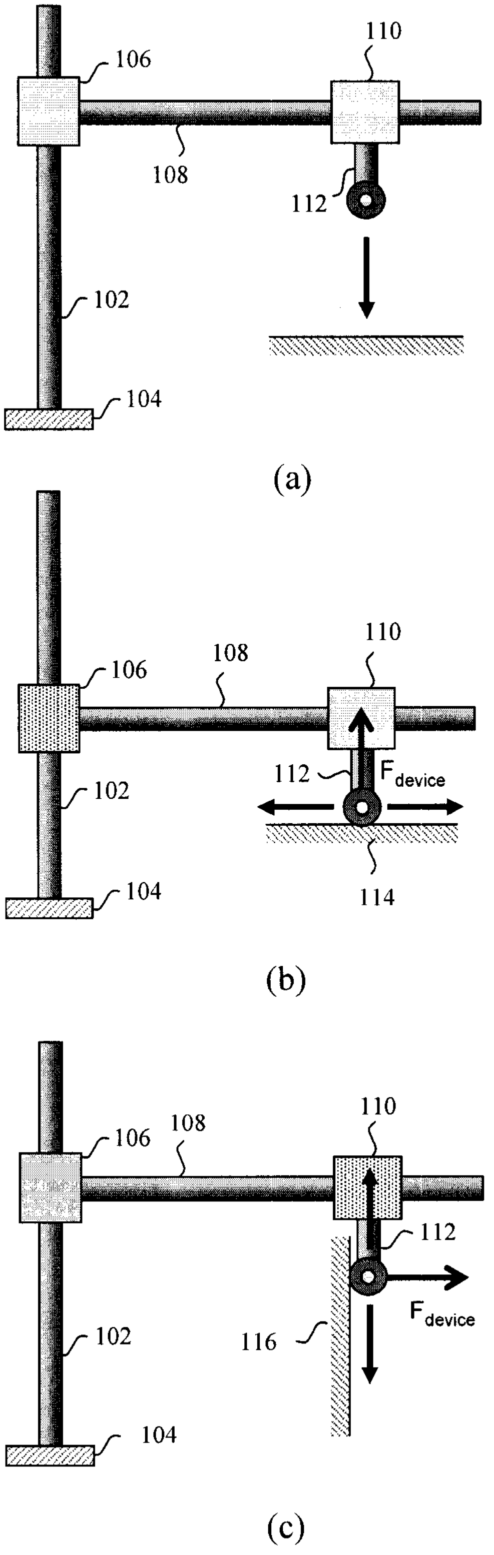
FIG. 1 schematically illustrates different modes of operation of two DOF (degrees of freedom) device having two kinematics bonds each including a braking device.

Before proceeding further with a detailed description of the figures, some further aspects of embodiments will be discussed.

In general, the present invention and its force-feedback devices and methods may be applied in any application where force-feedback towards at least one of a human user and a technical device is desired, necessary, helpful, requested etc., such as for example apparatus and/or method based applications in form of and/or in connection with haptic devices, robotic devices, tools holders, man-machine interfaces, user interfaces and control panels.

The force-feedback device may have an energy storing/release device being constructed to release stored energy for actuating a movement of the first member in at least one of the at least one degree of freedom for the first member.

The force-feedback device may comprise an actuation device being constructed to actuate a movement of the first member in at least one of the at least one degree of freedom for the first member.

In the force-feedback device, the energy storing/release device may be constructed to release stored energy for actuating a movement of the first member in at least one of the at least one degree of freedom for the first member, wherein the force-feedback device may further comprise an actuation device being constructed to actuate a movement of the first member in at least one of at least one degree of freedom for the first member.

In the force-feedback device, the first kinematics bond may comprise at least one sensor device being adapted to determine energy stored by the energy storing/release device. The force-feedback device may comprise at least one of an output member and an input member, wherein the first kinematics bond may be coupled with the output member and/or the input member.

In the force-feedback device, the first member may have a first and a second end and the first kinematics bond may be coupled with the first ends. In such examples, the force-feedback device may comprise a second kinematics bond being coupled with the second end of the first member and may further comprise a second member. The second kinematics bond may be constructed to provide at least one degree of freedom for movements of the second member, wherein the second kinematics bond may comprise a braking device being constructed to constrain movements of the second member in at least one of the at least one degree of freedom for the second member. The second kinematics bond may comprise an energy storing/release device being constructed to store energy in response to a movement of the second member in at least of at least one degree of freedom for the second member constrained by the braking device of the second kinematics bond.

In the force-feedback device, the braking device may include at least one of a clutch, a brake, an electromagnetic brake, an induction brake, a magnetic particle brake, a linear eddy current brake and a circular eddy current brake.

The energy storing/release device of the force-feedback device may include at least one of a spring, a cable, a wire, a string, a tendon, a band, a deformable solid state hinge, a deformable beam, a deformable bar, a deformable membrane and an elastic constraining element.

In the case the force-feedback device comprises the above actuation device, the actuation device may include at least one of a rotative actuator, a linear actuator, an electrical DC motor, an electrical brushless motor, a piezo-electrical actuator, a stick and slip actuator, an inertial drive actuator, an impact drive actuator, an ultra-sound actuator, a voice-coil actuator, a moving magnet actuator, a hydraulic actuator, a pneumatic actuator, a direct drive actuator, a transmission stage, gears, a timing belt, a cable, a band, a screw drive, an elastic constraining element, an artificial muscle actuator and a polymer actuator.

The force-feedback arrangement may have an energy storing/release device being constructed to release stored energy for actuating a movement of the respective one of the at least one member in at least one of the at least one degree of freedom.

The kinematics bond of the force-feedback arrangement may comprise an actuation device being constructed to actuate a movement of the respective one of the at least one member in at least one of the at least one degree of freedom.

The method of providing force-feedback may comprise generating, in a case the force generated by the releasing at least a portion of the stored energy is smaller than the required force, an additional force by an actuating device, and transferring the generated additional force also to the member.

In the force-feedback method, the force may comprise at least one of a translational force, a rotational force and torque.

The method of providing force-feedback may comprise to determine a quantity of stored energy and to determine whether the force required to move the member is at least one of larger, equal and smaller than the determined quantity of stored energy.

It is referred to FIG. 1, which schematically illustrates different modes of operation of a device with two degrees of freedom (2-DOF) and having two kinematics bonds each including a braking device;

The 2-DOF device of FIG. 1 includes a first member 102 being coupled with an end thereof with a support 104 or an input member. First member 102 is also coupled a first kinematics bond 106, here such that the first kinematics bond 106 is allowed to move along first member 102 (in FIG. 1 in vertical directions). First kinematics bond 106 is in turn coupled with an end of a second member 108, here such that first kinematics bond 106 remains at that end of second member 108 and is not moved there along. Movements of first kinematics bond 106 and first member 102 with respect to each other (for example by moving first kinematics bond 106 up and/or down first member 102) allow respective movements of second member 108.

In further embodiments first member 102 and first kinematics bond 106 may be coupled such that their positions are fixed with respect to each other; then first kinematics bond 106 can, for example, be constructed to enable rotational movements of second member 108 with respect to the fixation site of first member 102 and first kinematics bond 106.

In yet further embodiments, first kinematics bond 106 may be coupled with second member 108 such that they may be moved with respect to each other. For example, first kinematics bond 106 may be moved translationally along second member 108 and/or first kinematics bond 106 and second member 108 may be rotated with respect to each other, e.g. about a site where they are coupled.

In further yet embodiments, the above embodiments concerning moveability of first kinematics bond 106 and first and second members 102 and 108, respectively, are combined.

Second member 108 is coupled with a second kinematics bond 110, here such that second kinematics bond 110 is allowed to move along second member 108 (in FIG. 1 in horizontal directions). Second kinematics bond 110 is in turn coupled with output member 112. Movements of second kinematics bond 110 and second member 108 with respect to each other (for example by moving second kinematics bond 110 to right and/or left on second member 108) allow respective movements of output member 112.

In further embodiments second member 108 and second kinematics bond 110 may be coupled such that their positions are fixed with respect to each other; then second kinematics bond 110 can, for example, be constructed to enable rotational movements of output member 112 with respect to the fixation site of second member 108 and second kinematics bond 110.

In yet further embodiments, second kinematics bond 110 may be coupled with output member 112 such that they may be moved with respect to each other. For example, second kinematics bond 110 may be moved translationally along output member 112 and for second kinematics bond 110/210 and output member 112 may rotated with respect to each other, e.g. about a site where they are coupled.

In further yet embodiments, the above embodiments concerning moveability of second kinematics bond 110 and second and output members 110 and 112, respectively, are combined In the illustrated example, first kinematics bond 106 provides one DOF for first member 102 (translational vertical movements) and second kinematics bond 112 provides one DOF for second member 108 (translational horizontal movements). In further embodiments, at least one of the kinematics bonds may provide more than one DOF, for example, two, three, four, five or six DOFs. To this end, a kinematics bond comprising at least one a jointed link, a jointed parallelogram, a pivot joint, a pivot joint with remote rotation axis, a universal joint, a cardan joint, a spherical joint, a timing belt, a cable, a wire, a string, a tendon, a band, gears, a deformable solid state hinge, a deformable beam, a deformable bar, a deformable membrane, an elastic constraining element, a ball bearing, a friction bearing and/or surface portions in contact.

First and second kinematics bonds are here assumed to be comparably configured and, particularly, include a braking device. One, some or all braking devices may include, for example, at least one of a brake, electromagnetic brake, an induction brake, a magnetic particle brake, a linear eddy current brake, a circular eddy current brake, and a clutch. Further, one, some or all braking devices may include, for example, at least one of mechanical, electrical and/or electronic control mechanisms, units, chips hardware and software for at least partially controlling operation.

Further, for the illustrated example it is assumed that the braking devices, if being released, are in a state where no braking action is provided, while they are, if being actuated, in a state where, in dependence of the extent of actuation, braking action is provided. In further examples, the braking devices may be, if being released, in a state where braking action is provided, while they may be, if being actuated, in a state where, in dependence of the extent of actuation, a reduced or no braking action is provided. In further examples, a braking device may be, if being released, in a state where no braking action is provided and another braking device may be, if being actuated, in a state where, in dependence of the extent of actuation, a reduced or no braking action is provided.

In the assumed example, if both braking devices are released they do not constrain degrees of freedom provided by the respective kinematics bond 106 and 110, respectively. Then, the degrees of freedom of kinematics bonds 106 and 110 are operatively provided and second member 108 and output member 112 can be freely moved—as far as allow by the respective degrees of freedom. This is illustrated in FIG. 1(*a*).

FIG. 1(*b*) is for illustrating an operational mode wherein the braking device of first kinematics bond 106 is actuated and the braking device of second kinematics bond 110 is released. Then, by action of the braking device of first kinematics bond 106, the degree of freedom of first kinematics bond 106 is constrained and second member 108 cannot be moved along the degree of freedom from first kinematics bond 106. The degree of freedom of the second kinematics bond 110 is operatively provided and output member 112 can be freely as allowed by that degree of freedom. As a result, output member 112 is enabled for movements indicated by the horizontal arrows in FIG. 1(*b*), i.e. from left to right and/or vice versa. With respect to force feedback experienced at output member 112, this may be compared with vertical constraint or an horizontal wall 114.

If the braking device of first kinematics bond 106 is not fully actuated (while the braking device of second kinematics bond 110 is released) such that the degree of freedom from first kinematics bond 106 is not fully constrained second member 108 and, thus, output member 112 can be moved vertically; however, such a moving will require more effort (e.g. force input) to overcome the braking action of first kinematics bond 106. As a result, output member 112 is enabled for movements indicated by the horizontal arrows in FIG. 1(*b*), i.e. from left to right and vice versa, and also in vertical directions assuming the braking effect of first kinematics bond 106 is overcome. With respect to force feedback experienced at output member 112, this may be compared with vertical resistance against vertical movements or a virtual vertical static counterforce.

FIG. 1(*c*) is for illustrating an operational mode wherein the braking device of first kinematics bond 106 is released and the braking device of second kinematics bond 110 is actuated. Then, by action of the braking device of second kinematics bond 110, the degree of freedom of second kinematics bond 110 is constrained and output member 112 cannot be moved along the degree of freedom from second kinematics bond 10. The degree of freedom of the first kinematics bond 106 is operatively provided and second member 108 can be freely as allowed by that degree of freedom. As a result, output member 112 is enabled for movements indicated by the vertical arrows in FIG. 1(*c*), i.e. up and/or down. With respect to force feedback experienced at output member 112, this may be compared with horizontal constraint or a virtual vertical wall 116.

If the braking device of second kinematics bond 110 is not fully actuated (while the braking device of first kinematics bond 106 is released) such that the degree of freedom from second kinematics bond 110 is not fully constrained output member 112 can be moved horizontally; however, here moving of output member 112 will require more effort (e.g. force input) to overcome the braking action of second kinematics bond 110. As a result, output member 112 is enabled for movements indicated by the vertical arrows in FIG. 1(*b*), i.e. up and/or down, and also in horizontal directions assuming the braking effect of second kinematics bond 110 is overcome. With respect to force feedback experienced at output member 112, this may be compared with horizontal resistance against horizontal movements or a virtual horizontal static counterforce.

Figure 2:
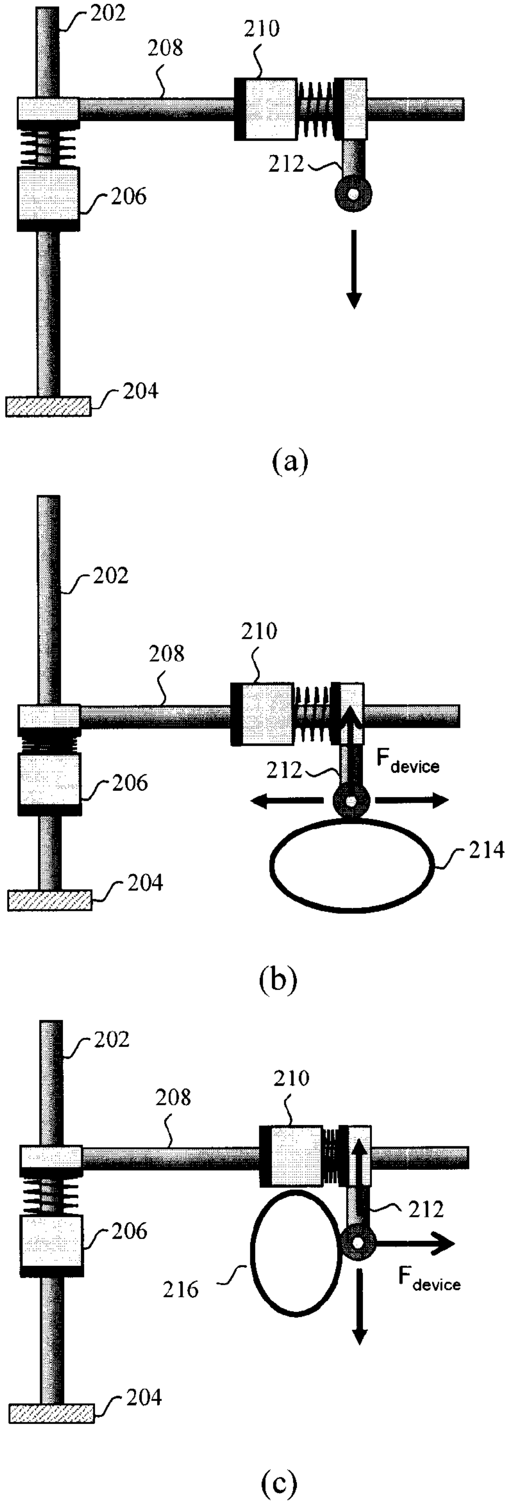
FIG. 2 schematically illustrates different modes of operation of two DOF device having two kinematics bonds each including a braking device and an energy storing/release device.

It is further referred to FIG. 2, which schematically illustrates different modes of operation of a device with two degrees of freedom (2-DOF) and having two kinematics bonds each including a braking device and an energy storing/release device;

The 2-DOF device of FIG. 2 includes a first member 202 being coupled with an end thereof with a support 204 or an input member (not shown). First member 202 is also coupled a first kinematics bond 206, here such that first kinematics bond 206 is allowed to moved along first member 202 (in FIG. 2 in vertical directions). First kinematics bond 206 is in turn coupled with an end of a second member 208, here such that first kinematics bond 206 remains at that end of second member 208 and is not moved there along. Movements of first kinematics bond 206 and first member 202 with respect to each other (for example by moving first kinematics bond 206 up and/or down first member 202) allow respective movements of second member 208.

In further embodiments first member 202 and first kinematics bond 206 may be coupled such that their positions are fixed with respect to each other; then first kinematics bond 206 can, for example, be constructed to enable rotational movements of second member 208 with respect to the fixation site of first member 202 and first kinematics bond 206.

In yet further embodiments, first kinematics bond 206 may be coupled with second members 208 such that they may be moved with respect to each other. For example, first kinematics bond 206 may be moved translationally along second member 108/208 and for first kinematics bond 206 and second members 208 may rotated with respect to each other, e.g. about a site where they are coupled.

In further yet embodiments, the above embodiments concerning moveability of first kinematics bond 206 and first and second members 206 and 208, respectively, are combined.

Second member 208 is coupled with a second kinematics bond 210, here such that second kinematics bond 210 is allowed to moved along second member 208 (in FIG. 2 in horizontal directions). Second kinematics bond 210 is in turn coupled with output member 212. Movements of second kinematics bond 210 and second member 208 with respect to each other (for example by moving second kinematics bond 210 to right and/or left on second member 208) allow respective movements of output member 212.

In further embodiments second member 208 and second kinematics bond 210 may be coupled such that their positions are fixed with respect to each other; then second kinematics bond 210 can, for example, be constructed to enable rotational movements of output member 212 with respect to the fixation site of second member 208 and second kinematics bond 210.

In yet further embodiments, second kinematics bond 210 may be coupled with output members 212 such that they may be moved with respect to each other. For example, second kinematics bond 210 may be moved translationally along output member 212 and for second kinematics bond 210 and output members 212 may rotated with respect to each other, e.g. about a site where they are coupled.

In further yet embodiments, the above embodiments concerning moveability of second kinematics bond 210 and second and output members 210 and 212, respectively, are combined.

In the illustrated example, first kinematics bond 206 provides one DOF for first member 202 (translational vertical movements) and second kinematics bond 210 provides one DOF for second member 208 (translational horizontal movements). In further embodiments, at least one of the kinematics bonds may provide more than one DOF, for example, two, three, four, five or six DOFs. To this end, a kinematics bond comprising at least one of a jointed link, a jointed parallelogram, a pivot joint, a pivot joint with remote rotation axis, a universal joint, a cardan joint, a spherical joint, a timing belt, a cable, a wire, a string, a tendon, a band, gears, a deformable solid state hinge, a deformable beam, a deformable bar, a deformable membrane, an elastic constraining element, a ball bearing, a friction bearing and surface portions in contact.

First and second kinematics bonds are here assumed to be comparably configured and, particularly, include a braking device and an energy storing/released device. The braking devices may include, for example, at least one of a brake, a magnetic particle brake, and a clutch. Further, the braking devices may include, for example, at least one of mechanical, electrical and/or electronic control mechanisms, units, chips, hardware and software for at least partially controlling their operation.

Further, for the illustrated example it is assumed that the braking devices, if being released, are in a state where no braking action is provided, while they are, if being actuated, in a state where, in dependence of the extent of actuation, braking action is provided. In further examples, the braking devices may be, if being released, in a state where braking action is provided, while they may be, if being actuated, in a state where, in dependence of the extent of actuation, a reduced or no braking action is provided. In further examples, a braking device may be, if being released, in a state where no braking action is provided and another braking device may be, if being actuated, in a state where, in dependence of the extent of actuation, a reduced or no braking action is provided.

In the assumed example, if both braking devices are released they do not constrain degrees of freedom provided by the respective kinematics bond 206 and 210, respectively. Then, the degrees of freedom of kinematics bonds 206 and 210 are operatively provided and second member 208 and output member 212 can be freely moved—as far as allowed by the respective degrees of freedom. This is illustrated in FIG. 2(*a*).

For the illustrated example, it is further assumed that the energy storing/release device includes, for example, at least one of a spring, a cable, a wire, a string, a tendon, a band, a deformable solid state lunge, a deformable lunge, a deformable bar, a deformable membrane, an elastic constraining element. The mentioned deformable means may have, as alternative or in addition, a pliable, elastic springy and/or resilient characteristic.

Further it is contemplated, for the illustrated embodiment, that the energy storing/release device 222 is arranged—with respect to the respective braking device and member on which the braking device may act such that a movement of the member can impose a force (e.g. translational force and/or a rotational force and/or torque) on the energy storing/release device 222. Particularly, such a force imposition may be enabled if the associated braking device is not fully released and at least partially actuated (assuming the above assumed operation of a braking device); in such cases it is possible to provide a force feedback sensation that may be illustrated by an action like grasping/squeezing a rubber ball or punching in a resilient wall, as will be disclosed in grater detail further below. In further examples, a force may be (also) imposed on the energy storing release device 222 if the associated brake is fully released; in such cases, it is possible to provide a force feedback sensation that may be illustrated by an action like moving in a viscid or viscoelastic medium or surrounding.

A force applied on the energy storing/release device 222 in response to a movement of the respective member is, at least partially, stored by the energy storing/release device 222. Such storing can be achieved by deformation of one or more elastic resilient or the like component, for example, one or more springs and/or one or more of the above-mentioned further examples.

In FIG. 2(*b*) is for illustrating an operational mode wherein the braking device of first kinematics bond 206 is actuated and the braking device of second kinematics bond 210 is released. The degree of freedom of the second kinematics bond 210 is operatively provided and output member 212 can be freely as allowed by that degree of freedom. As a result, output member 212 is enabled for movements indicated by the horizontal arrows in FIG. 2(*b*), i.e. from left to right and/or vice versa. By action of the braking device of first kinematics bond 206, the degree of freedom of first kinematics bond 206 is constrained. However, the energy storing/release device 222 of first kinematics bond 206 allows, to a certain extent depending from its energy storing capability, movements of the second member 208 against the constraint provided by the braking device of first kinematics bond 206. For example, moving second member 208, in FIG. 2(*b*), down causes the energy storing/release device 222 of first kinematics bond 206 to store energy resulting from that movement. Assuming, for example, resilient characteristics of that energy storing/release device 222, second member 208 can be moved in this direction as long as the energy storing/release device 222 exhibits its resilient characteristics and cannot be moved further when the energy storing/release device 222 does not behave resiliently anymore or, in illustrative terms, is fully loaded. Then, movements of second member 208 further in this direction are constrained; second member 208 cannot be moved anymore. From a force feedback point of view, this can be compared with a movement of member 212 against a resilient or elastic body, for example, a ball 214.

If the braking device of first kinematics bond 206 is not fully actuated then an (e.g. the maximum) energy that can be stored by the energy storing/release device may be reduced to a limit where an (e.g. the maximum) output force of the energy storing/release device equals to the force necessary to move the partially actuated braking device 206 along member 202.

FIG. 2(*c*) is for illustrating an operational mode wherein the braking device of first kinematics bond 206 is released and the braking device of second kinematics bond 210 is actuated. The degree of freedom of the first kinematics bond 206 is operatively provided and second member 208 can be freely as allowed by that degree of freedom. As a result, output member 212 is enabled for movements indicated by the vertical arrows in FIG. 2(*c*), i.e. up and/or down. By action of the braking device of second kinematics bond 210, the degree of freedom of second kinematics bond 210 is constrained. However, the energy storing/release device of second kinematics bond 210 allows, to a certain extent depending from its energy storing capability, movements of the second member 208 against the constrained provided by the braking device of second kinematics bond 210. For example, moving second member 208, in FIG. 2(*c*), to the left causes the energy storing/release device of a second kinematics bond 210 to store energy resulting from that movement. Assuming, for example, resilient characteristics of that energy storing/release device, second member 208 can be moved in this direction as long as the energy storing/release device exhibits its resilient characteristics and cannot be moved further when the energy storing/release device does not behave resilient anymore or, in illustrative terms, is fully loaded. Then, movements of the second member 208 further in this direction are constrained; second member 208 cannot be moved anymore. From a force feedback point of view, this can be compared with a movement of output member 210 against an resilient or elastic body, for example, a ball 216.

If the braking device of second kinematics bond 210 is not fully actuated then an (e.g. the maximum) energy that can be stored by the energy storing/release device may be reduced to the limit where an (e.g. the maximum) output force of the energy storing/release device equals to the force necessary to move the partially actuated braking device 210 along member 208.

Figure 3:
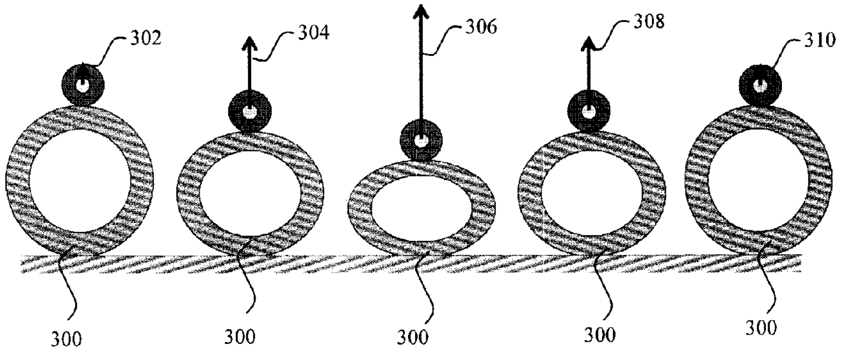
FIG. 3 schematically illustrates interaction between a virtual tool and an elastic body represented here by a sphere.

The force feedback sensation enabled with the example of FIG. 2, can be "visualized" by the following situation schematically represented in FIG. 3. In the real world, a person may interact with an object by moving it, grasping it or even deforming it. The latter occurs for instance when grasping a rubber ball with the hand. When an elastic body deforms, potential energy is stored internally and is released when the external forces or physical constraints disappear. In a scenario where a ball is grasped by a hand, the energy necessary to deform the object is provided entirely by the person manipulating the ball and the energy released back to the person is entirely provided by the ball and not, e.g., the surrounding environment. This feedback sensation may be desired when using, for example, a haptic device for, e.g., medical, robotic and/or entertainment ("gaming") applications. By including into a kinematics bond an energy store/release device, a haptic device may be adapted to provide an "elastic feedback feeling" as in reality when interacting (e.g. touching, grasping, pushing etc.) with an object having for example elastic, flexible, pliant, springy and/or resilient characteristic FIG. 3 illustrates force-feedback situations, comparable to those for a person pressing/squeezing a ball, with respect to a virtual ball 300.

Interacting with ball 300, for example in a computer-animated virtual reality environment, starts in FIG. 3 left with a small pressing force onto ball 300 resulting in a respective small force-feedback force 302. Increasingly pressing the ball 300 (second and third left examples in FIG. 3) results in respectively increased force-feedback forces 304 and 306, respectively. If the virtual pressing action onto ball 300 is reduced (two examples in FIG. 3 right), the force-feedback is also reduced, as indicated by force-feedback forces 308 and 310, respectively.

Figure 4:
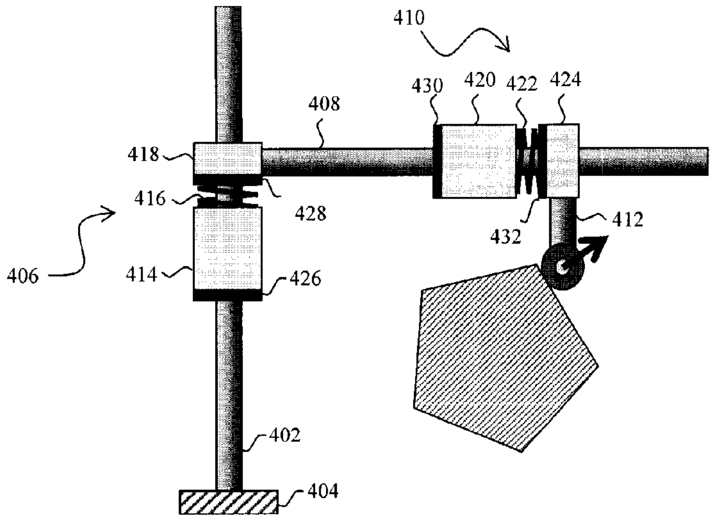
FIG. 4 schematically illustrates two DOF device having two kinematics bonds each including a braking device and an energy storing/release device.

FIG. 4 illustrates an example including a first member 402, a support 404, a first kinematics bond 406, a second member 408, a second kinematics bond 410 and an output member 412.

As illustrated, first kinematics bond 406 comprises a braking device 414 and an energy storing/release device 416. For illustration purposes, energy storing/release device 416 is presented like a spring to visualize elastic, resilient characteristics capable of storing and releasing energy. Energy storing/release device 416 is arranged between braking device 414 and an abutment member 418.

Second kinematics bond 410 comprises a braking device 420 and an energy storing/release device 422. Energy storing/release device 422 is also shown, for illustration only, in form of a spring being arranged between braking device 420 and abutment member 424.

Due to the use of energy storing/release devices and braking devices, the example of FIG. 4 may be also referred to as hybrid actuation apparatus or hybrid actuator.

By means of at least one sensor device, a relative displacement between first member 402 and second member 408 and/or energy currently stored by the energy storing/release device 416 may be determined. The sensor device may include, for example, one, two or more position sensors 426 and 428. In such an arrangement, a position sensor may be used for determining a relative displacement between first member 402 and second member 408. By means of a second position sensor it is possible, in some embodiments, to determine energy stored by the energy storing/release device 416. To this end and in the example of FIG. 4, the position sensors 426 and 428 can be operated to determine a relative displacement between abutment member 418 and braking device 414. Information about such a displacement possible in combination with information on the characteristic of energy storing/release device 416, energy stored therein can be determined. For example, assuming an energy storing/release device having spring-like properties, a measure indicating its spring-like characteristic (e.g. physical stiffness) may be used in combination with information on the current compression (e.g. determined on the basis of, for example, distance between a braking device 414 and abutment member 418) the currently stored energy can be determined.

By means of at least one sensor device, a relative displacement between first member 408 and second member 412 and/or energy currently stored by the energy storing/release device 422 may be determined. The sensor device may include, for example, one, two or more position sensors 430 and 432. In such an arrangement, a position sensor may be used for determining a relative displacement between first member 408 and second member 412. By means of a second position sensor it is possible, in some embodiments, to determine energy stored by the energy storing/release device 422. To this end and in the example of FIG. 4, the position sensors 430 and 432 can be operated to determine a relative displacement between abutment member 424 and braking device 430. Information about such a displacement possible in combination with information on the characteristic of energy storing/release device 422, energy stored therein can be determined. For example, assuming an energy storing/release device having spring-like properties, a measure indicating its spring-like characteristic (e.g. physical stiffness) may be used in combination with information on the current compression (e.g. determined on the basis of, for example, distance between a braking device 420 and abutment member 424) the currently stored energy can be determined.

When both kinematics bonds 406 and 410 and, particularly, their braking devices 414 and 420 are not constrained or activated, output member 412 may be freely moved throughout the entire workspace of the illustrated example. If at least one of the braking devices 414 and 420 is activated, output member 412 can be still moved freely but only for movements in directions not constrained by the actuated braking device(s). If in such a situation the output member 412 is moved against a prevailing constraint, the movement will result, on the one hand, in a reaction force provided by the respective energy storing/release device(s) 416/422 due to its (their) elastic, resilient characteristic(s). On the other hand, such a movement will cause energy to be stored in the respective energy storing/release device(s) 416/422.

Determining the currently stored energy, for example by using one or more of the above described sensor devices, can be performed continuously, in predefined intervals or the like during operation in order to always have current information on the actually stored energy.

If output member 412 after having been moved against a constraint it is at least partially released, the reaction force(s) of the involved energy storing/release device(s) may move output member 412 in a direction opposite to the direction of its previous movement. The actual energy stored can be maintained and/or reduced by controlling the braking activity of the associated braking device(s). By releasing the braking device stored energy may be partially or totally released. As a result, a force perceived at output member 412 can be modified, for example, with respect to direction and/or magnitude. In particular, it is possible to determine a desired force to be perceived at output member 412 and to release stored energy accordingly.

Figure 5:
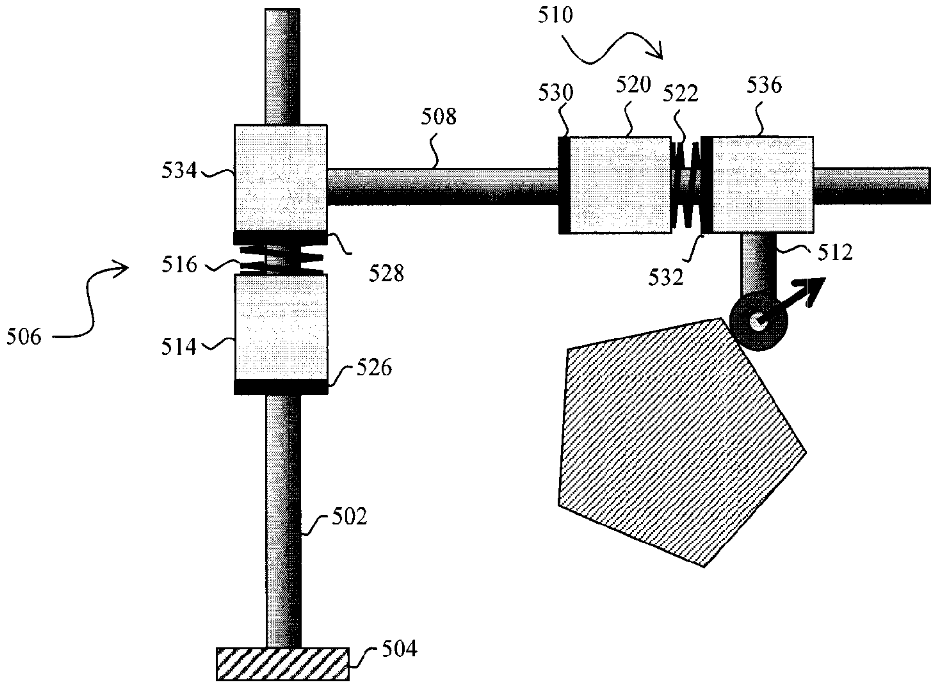
FIG. 5 schematically illustrates two DOF device having two kinematics bonds each including a braking device, an energy storing/release device and an actuation device.

FIG. 5 illustrates an example including a first member 502, a support 504, a first kinematics bond 506, a second member 508, a second kinematics bond 510 and an output member 512.

As illustrated, first kinematics bond 506 comprises a braking device 514, an energy storing/release device 516 and an actuator device 534. For illustration purposes, energy storing/release device 516 is presented like a spring to visualize elastic, resilient characteristics capable of storing and releasing energy. Energy storing/released device 516 is arranged between braking device 514 and an actuator device 534.

Second kinematics bond 510 comprises a braking device 520, an energy storing/release device 522 and an actuator device 536. Energy storing/release device 522 is also shown, for illustration only, in form of a spring being arranged between braking device 520 and actuator device 536.

By means of at least one sensor device, a relative displacement between first member 502 and second member 508 and/or energy currently stored by the energy storing/release device 516 may be determined. The sensor device may include, for example, one, two or more position sensors 526 and 528. In such an arrangement, a position sensor may be used for determining a relative displacement between first member 502 and second member 508. By means of a second position sensor it is possible, in some embodiments, to determine energy stored by the energy storing/release device 516. To this end and in the example of FIG. 5, the position sensors 526 and 528 can be operated to determine a relative displacement between actuation device 534 and braking device 514. Information about such a displacement possible in combination with information on the characteristic of energy storing/release device 516, energy stored therein can be determined. For example, assuming an energy storing/release device having spring-like properties, a measure indicating its spring-like characteristic (e.g. physical stiffness) may be used in combination with information on the current compression (e.g. determined on the basis of, for example, distance between a braking device 514 and actuator device 518) the currently stored energy can be determined.

By means of at least one sensor device, a relative displacement between first member 508 and second member 512 and/or energy currently stored by the energy storing/release device 522 may be determined. The sensor device may include, for example, one, two or more position sensors 530 and 532. In such an arrangement, a position sensor may be used for determining a relative displacement between first member 508 and second member 512. By means of a second position sensor it is possible, in some embodiments, to determine energy stored by the energy storing/release device 522. To this end and in the example of FIG. 5, the position sensors 530 and 532 can be operated to determine a relative displacement between actuator device 536 and braking device 520. Information about such a displacement possible in combination with information on the characteristic of energy storing/release device 522, energy stored therein can be determined. For example, assuming an energy storing/release device having spring-like properties, a measure indicating its spring-like characteristic (e.g. physical stiffness) may be used in combination with information on the current compression (e.g. determined on the basis of, for example, distance between a braking device 520 and actuator device 536) the currently stored energy can be determined.

When both kinematics bonds 506 and 510 and, particularly, their braking devices 514 and 520 are not constrained or activated, output member 512 may be freely moved throughout the entire workspace of the illustrated example. If at least one of the braking devices 514 and 520 is activated, output member 512 can be still moved freely but only for movements in directions not constrained by the actuated braking device(s). If in such a situation the output member 512 is moved against a prevailing constraint, the movement will result, on the one hand, in a reaction force provided by the respective energy storing/release device(s) 516, 522 due to its (their) elastic, resilient characteristic(s). On the other hand, such a movement will cause energy to be stored in the respective energy storing/release device(s) 516, 522.

Determining the currently stored energy, for example by using one or more of the above described sensor devices, can be performed continuously, in predefined intervals or the like during operation in order to always have current information on the actually stored energy.

If output member 512 after having been moved against a constraint it is at least partially released, the reaction force(s) of the involved energy storing/release device(s) may move output member 512 in a direction opposite to the direction of its previous movement. The actual energy stored can be maintained and/or reduced by controlling the braking activity of the associated braking device(s). By releasing the braking device stored energy may be partially or totally released. As a result, a force perceived at output member 512 can be modified, for example, with respect to direction and/or magnitude. In particular, it is possible to determine a desired force to be perceived at output member 512 and to release stored energy accordingly.

Apart from the following observations, the above observations given with respect to FIG. 4 also apply to the example of FIG. 5. As stated above, stored energy may be released in a desired extent by controlling (e.g. activating and/or releasing an involved braking device) in order to provide a desired force to be perceived at output member 512. In some embodiments it might be possible that a desired force at output member 512 cannot be obtained because, for example, stored energy is not sufficient and/or energy loss in one or more kinematics bonds and/or a desired force that cannot be at least partially rendered from the stored energy. An example for the latter case may be a desired force opposite to a direction in which a spring-like energy storing/releasing device have been pre-loaded.

Such situations can be resolved on the basis of the example of FIG. 5. In particular, actuating device 534 and actuating device 536 may be used to provide force(s) bridging a difference between a desired force and force that can be generated from energy stored in the energy storing/release device(s). Using the actuation device 534 and/or the actuation device 536 and also releasing energy stored by the energy storing/release device 516 and/or the energy storing/releasing device 522, forces applied at output member 512 are than a combined contribution of the actuation device(s) and the energy storing/release device(s).

As in the example of FIG. 4, the example of FIG. 5 exhibits at least some low pass filtering property. While the energy storing/release device(s) is capable of storing and releasing energy when moving output member 512 (e.g. moved by an operator interacting in a virtual environment), the energy storing/released device(s) can also act as low pass filter(s). As a result, a force spectrum of force(s) applied at output member 512 may be decoupled into two regions, wherein low frequency may be primarily handled by the energy storing/release device(s) and/or the braking device(s) and wherein high frequencies may be handled or operated by the actuation device(s).

Due to the use of energy storing/release devices, braking devices and actuation devices, the example of FIG. 5 may be also referred to as hybrid actuation apparatus or hybrid actuator.

Figure 6:
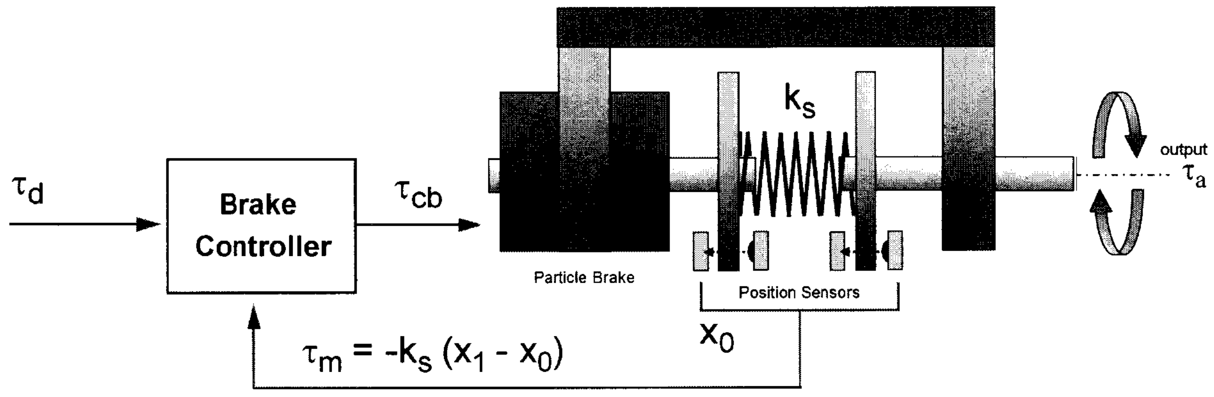
FIG. 6 schematically illustrates an actuation and control topology for a kinematics bond including a braking device and an energy storing/release device.

FIG. 6 illustrates an exemplary actuation and control topology that may be used with any the above examples. Here, the example is described with reference to the example of FIG. 5 in order to illustrate several different possible functions and operations. For simplification purposes only, the description is given with reference to a single kinematics bond; of course, two, three or more kinematics bonds can be controlled in the same manner as well. Also for simplification purposes only, it is assumed that the kinematics bond considered here comprises a magnetic particle brake comprised by its braking device, a spring comprised by its energy storing/release device, and two position sensors comprised by its at least one sensor device.

With reference to the example of FIG. 6, the illustrated controller takes as an input command a desired force $F_d$. The desired force $F_d$ is a force to be applied to the output member. For each kinematics bond a desired torque $\tau_d$ is determined. The desired torque $\tau_d$ may be computed by below equation 1:

$$\Gamma_d = J^T(q) \times F_d \qquad \text{Equation 1}$$

Based on the desired torque $\tau_d$, the controller determines respective control commands for the braking device, namely commanded torques $\tau_{cb}$. Such control commands are communicated to the braking device, according to the illustration of FIG. 6, via a brake controller.

Control commands for the braking device may be computed as follows. In a first stage a torque provided by the energy storing/release device is determined, for example, by measuring a current torsional angle of the spring shown in FIG. 6 and by multiplying the torsional angle's value by a torsional spring stiffness $k_s$. This relation is expressed by equation 2:

$$\Gamma_s = K_s \cdot (x_1 - x_0) \qquad \text{Equation 2}$$

Here, it is assumed to measure a torsional angle by comparing values of the position sensors by means of which a current deformation (e.g. compression) of the spring illustrated in FIG. 6 may be sensed. If the braking device would be disabled, the torque provided by the energy storing/release device will be zero or near zero.

In a second stage, it is possible to perform a sign comparison between the values of the desired torque $\Gamma_d$ and the sensed torque $\Gamma_s$. Such a sign comparison may result in a situation wherein the signs of both values coincide; in other words, the values of the desired torque and the sensed torque are either both positive or both negative. In such situations, a control command for a commanded torque $\tau_{cb}$ is communicated to the braking device. The desired force at the output member may be then generated by the energy storing/release device(s).

The above sign comparison may result in a situation wherein the signs of the desired torque and the sensed torque differ. Such situations may occur, for example, when the desired force is in an opposite direction to a direction in which an energy storing/release device currently exerts force(s) at a given time. Such situations may require to release virtually all stored energy. To this end, the associated braking device is fully released, for example, by communicating a control command of a commanded torque $\tau_{cb}$ of zero.

Figure 7:
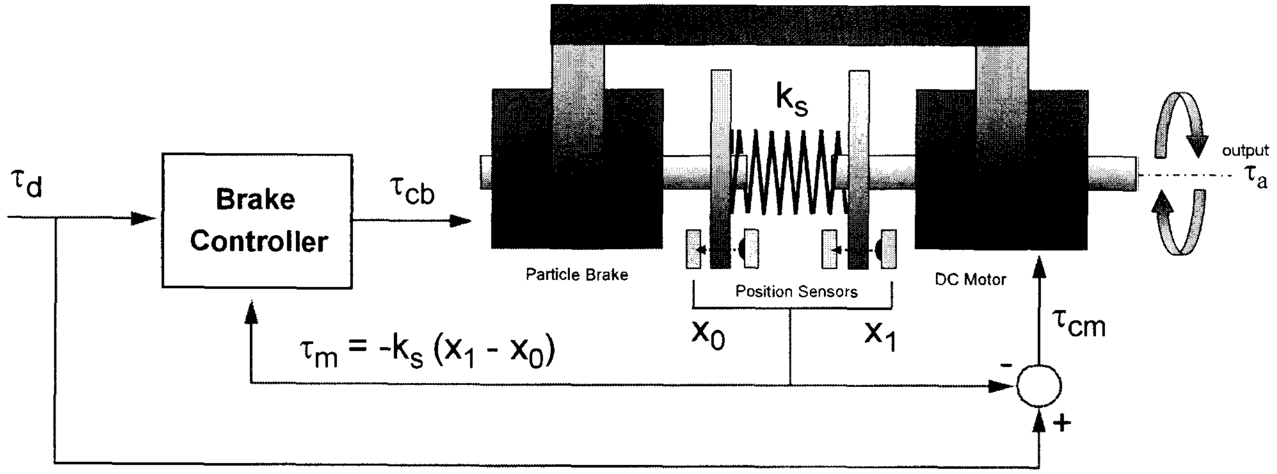
FIG. 7 schematically illustrates an actuation and control topology for a kinematics bond including a braking device, an energy storing/release and an actuation device.

FIG. 7 illustrates an exemplary actuation and control topology that may be used with any of the above examples. Here, the example is described with reference to the example of FIG. 5 in order to illustrate several different possible functions and operations. For simplification purposes only, the description is given with reference to a single kinematics bond; of course, two, three or more kinematics bonds can be controlled in the same manner as well. Also for simplification purposes only, it is assumed that the kinematics bond considered here comprises a magnetic particle brake comprised by its braking device, a spring comprised by its energy storing/release device, two position sensors comprised by its at least one sensor device and a mini-motor comprised by its actuation device.

With reference to the example of FIG. 7, the illustrated controller takes as an input command a desired force $F_d$. The desired force $F_d$ is a force to be applied to the output member. For each kinematics bond a desired torque $\tau_d$ is determined. The desired torque $\tau_d$ may be computed by below equation 1:

$$\Gamma_d = J^T(q) \times F_d \qquad \text{Equation 1}$$

Based on the desired torque $\tau_d$, the controller determines respective control commands for the braking device and the actuation device, namely commanded torques $\tau_{cb}$ and commanded torque $\tau_{cm}$. These control commands are communicated to the braking device, according to the illustration of FIG. 7, via a brake controller, and to the actuation device.

The control commands for the braking device and the actuation device may be computed as follows. In a first stage a torque provided by the energy storing/release device is determined, for example, by measuring a current torsional angle of the spring shown in FIG. 7 and by multiplying the torsional angle's value by a torsional spring stiffness $K_s$. This relation is expressed by equation 2:

$$\Gamma_s = K_s \cdot (x_1 - x_0) \qquad \text{Equation 2}$$

Here, it is assumed to measure a torsional angle by comparing values of the position sensors by means of which a current deformation (e.g. compression) of the spring illustrated in FIG. 7 may be sensed. If the braking device would be disabled, the torque provided by the energy storing/release device will be zero or near zero.

In a second stage, it is possible to perform a sign comparison between the values of the desired torque $\Gamma_d$ and the sensed torque $\Gamma_s$. Such a sign comparison may result in a situation wherein the signs of both values coincide; in other words, the values of the desired torque and the sensed torque are either both positive or both negative. In such situations, a control command for a commanded torque $\tau_{cb}$ is communicated to the braking device and a control command for a commanded torque $\tau_{cm}$ is communicated to the actuation device. The commanded torque $\tau_{cm}$ for the actuation device may correspond with a difference between the desired torque $\Gamma_d$ and the sensed torque $\Gamma_s$ provided by the energy storing/release device. In such situations, the desired force at the output member may be mainly generated by the energy storing/release device(s) while a minor part results from operation of the actuation device(s).

The above sign comparison may result in a situation wherein the signs of the desired torque and the sensed torque differ. Such situations may occur, for example, when the desired force is in an opposite direction to a direction in which an energy storing/release device currently exerts force(s) at a given time. Such situations may require to release virtually all stored energy. To this end, the associated braking device is fully released, for example, by communicating a control command of a commanded torque $\tau_{cb}$ of zero, while the associated actuation device is operated to provide the desired force in total, for example, by communicating a control command for a commanded torque $\tau_{cm}$ set to the desired value. In such situations, the desired force at the output member is primarily generated by the actuation device(s) without or with just a minor contribution coming from the energy storing/release device(s).

Figure 8:
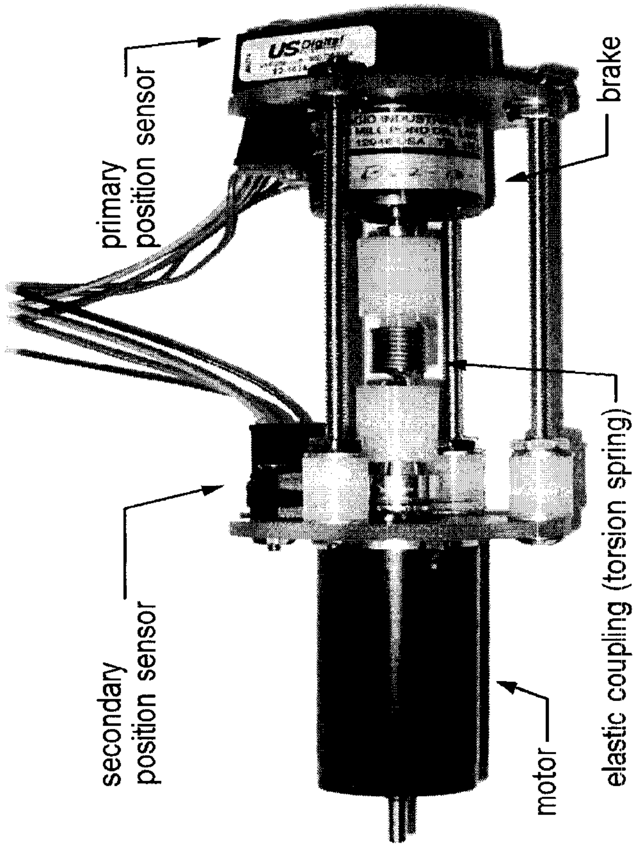
FIG. 8 shows an implementation of a hybrid actuator composed on a braking device (exemplary in form of a particle brake), an energy storing/release device (exemplary in form of a torsion spring), and an actuation device (exemplary in form of an actuator or a DC motor)

FIG. 8 shows an exemplary practical implementation of the arrangement illustrated in FIG. 7. The above observations given with respect to FIG. 7 correspondingly apply to the implementation example of FIG. 8.

Figure 9:
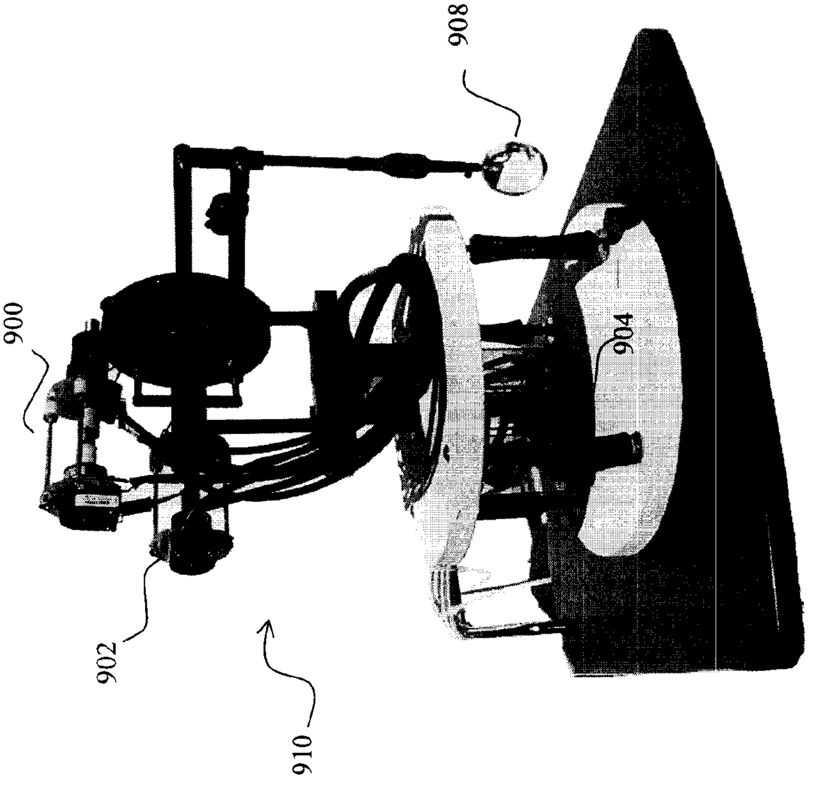
FIG. 9 shows an application in form of a haptic/robotic device including hybrid actuators.

FIG. 9 illustrates an exemplary application in form of hybrid actuators 900, 902 and 904 (e.g. according to FIG. 4, FIG. 5, FIG. 6 or FIG. 7) used in a haptic/robotic device 910. By means of hybrid actuators 900, 902 and 904, force-feedback may be provided at an output member 908 of haptic/robotic device 910. By holding the output member 908 which can be translated in three-dimensional space within the workspace limits of the device, the user can control a virtual tool in a virtual environment for instance. Interaction forces computed between the tool and the objects in the virtual environment are sent back to the user by sending force commands to the three actuators 900, 902 and 904.

Figure 10:
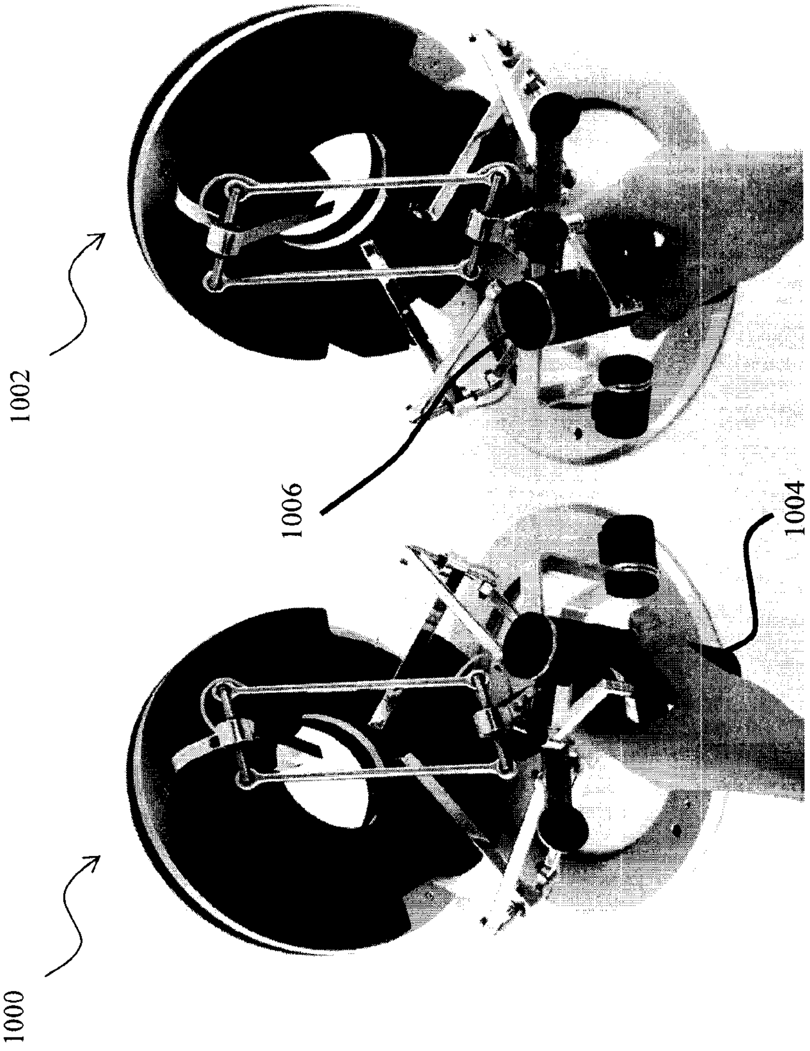
FIG. 10 shows an application example in form of a bi-manual seven DOF haptic device.

FIG. 10 illustrates a further exemplary application, here in form of a robotic manipulator arrangement including a left-hand manipulator 1000 and right-hand manipulator 1002. Each manipulator 1000 and 1002 includes a hybrid actuator 1004 and 1006, respectively. By means of hybrid actuators 1004 and 1006 force-feedback can be provided to the left-hand and the right-hand, respectively, of a human user. The shown application can be considered as be-manual 7 DOF haptic device.

Although the above description refers to specific examples, components, implementations and applications, it is apparent that it is intended to cover all modifications and equivalents within the spirit of scope of the claims. It should be also understood that the present disclosure includes all possible combinations of any individual features, components, parts, implementations and applications described above and recited in any of the claims.

What is claimed is:

1. A force-feedback apparatus for a haptic device, comprising:

a first member;

a first kinematics bond being coupled with said first member;

a second member;

a brake controller;

said first kinematics bond being constructed to provide at least one degree of freedom for movements of said first member in relation to said second member;

said first kinematics bond comprising a braking device being controlled by said brake controller and constructed to constrain, by braking action, movements of the said first member in at least one of said at least one degree of freedom, wherein the braking device is controlled to assume a released state, in which the braking device provides no braking action to constrain movements of the said first member in at least one of said at least one degree of freedom, and an at least partially actuated state, in which the braking device provides braking action constraining movements of the said first member in at least one of said at least one degree of freedom;

a energy storing/release device being operatively coupled to said braking device and constructed to store energy in an amount which is a function of movement of said first member and said second member in relation to each other in at least one of said at least one degree of freedom, wherein said energy storing/release device stores energy in an amount which is a function of movement of said first member and said second member in relation to each other in at least one of said at least one degree of freedom in the case said braking device is in said an at least partially actuated state and does not store energy in an amount which is a function of movement of said first member and said second member in relation to each other in at least one of said at least one degree of freedom in the case said braking device is in said release state; and an actuator actuation device being constructed to actuate, in dependence from a determined relative displacement between said first member and said second member, a movement of said first member in at least one of said at least one degree of freedom for said first member.

2. The apparatus of claim 1, wherein said energy storing/release device is constructed to release, in dependence from the determined relative displacement between said first member and said second member, stored energy for actuating a movement of the said first member in at least one of said at least one degree of freedom for said first member.

3. The apparatus of claim 1, wherein said energy storing/release device is constructed to release, in dependence from the determined relative displacement between said first member and said second member, stored energy for actuating a movement of said first member in at least one of said at least one degree of freedom for said first member.

4. The apparatus of claim 1, wherein said first member is an output member or an input member.

5. The apparatus of claim 1, wherein said second member has a first end and a second end, and said first kinematics bond is coupled with said first end, and further comprising a second kinematics bond being coupled with said second end and a third member, said second kinematics bond being constructed to provide at least one degree of freedom for movements of said third member in relation to said second member; and said second kinematics bond comprises a braking device being constructed to constrain movements of the said second member in at least one of said at least one degree of freedom for said third member, and an energy storing/release device being constructed to store energy in response to a movement of said second member and said third member in relation to each other in at least one of said at least one degree of freedom for said third member after being constrained by said braking device of said second kinematics bond.

6. The apparatus of claim 1, wherein said braking device includes at least one selected from a clutch, a brake, an electromagnetic brake, a magnetic particle brake, a linear eddy current brake, and a circular eddy current brake.

7. The apparatus of claim 1, wherein the energy storing/release device includes at least one selected from a spring; a cable; a wire; a string; a tendon; a band; a deformable solid state hinge; a deformable beam; a deformable bar; a deformable membrane; and an elastic constraining element.

8. The apparatus of claim 1, wherein the actuation device includes at least one selected from a rotative actuator, a linear actuator, an electrical DC motor, an electrical brushless motor, a piezo-electrical actuator, a stick and slip actuator, an inertial drive actuator, an impact drive actuator, an ultra-sound actuator, a voice-coil actuator, a moving magnet actuator, a hydraulic actuator, a pneumatic actuator, a direct drive actuator, a transmission stage, gears, a timing belt, a cable, a band, a screw drive, an elastic constraining element, an artificial muscle actuator, and a polymer actuator.

9. A haptic device comprising the force-feedback apparatus of claim 1.

10. The apparatus of claim 1, wherein said energy storing/release device is constructed to provide at least one of a torque feedback and force feedback to said first member, said feedback being a function of the energy being stored by said energy storing/release device.

11. The apparatus of claim 1, wherein said first kinematics bond comprises at least one sensor device including at least one position sensor, said at least one sensor device being adapted to determine energy stored by said energy storing/release device by determining a relative displacement between said braking device and said second member.

* * * * *